US008264503B1

(12) United States Patent
Parenteau et al.

(10) Patent No.: US 8,264,503 B1
(45) Date of Patent: Sep. 11, 2012

(54) BATCH EARLY ENGAGEMENT RULES GRAPHICS PROCESSING

(75) Inventors: Alexandre S. Parenteau, San Jose, CA (US); Daniel J. Clark, Big Sur, CA (US)

(73) Assignee: Adobe Systems Incorporated, San Jose, CA (US)

( * ) Notice: Subject to any disclaimer, the term of this patent is extended or adjusted under 35 U.S.C. 154(b) by 1156 days.

(21) Appl. No.: 11/586,040

(22) Filed: Oct. 24, 2006

(51) Int. Cl.
*G09G 5/00* (2006.01)
(52) U.S. Cl. .................... 345/620; 345/619
(58) Field of Classification Search .......... 345/619
See application file for complete search history.

(56) References Cited

U.S. PATENT DOCUMENTS

| | | | |
|---|---|---|---|
| 6,795,080 B2 | 9/2004 | Lavelle et al. | |
| 6,999,076 B2 | 2/2006 | Morein | |
| 7,068,272 B1 * | 6/2006 | Voorhies et al. | 345/422 |
| 7,184,040 B1 * | 2/2007 | Tzvetkov | 345/421 |
| 7,212,204 B2 | 5/2007 | Farinelli | |
| 7,286,140 B2 | 10/2007 | Butcher | |
| 2003/0160788 A1 * | 8/2003 | Buehler | 345/422 |
| 2005/0116963 A1 * | 6/2005 | Bourdev et al. | 345/619 |
| 2005/0195220 A1 * | 9/2005 | Northway et al. | 345/620 |
| 2005/0206647 A1 * | 9/2005 | Xu et al. | 345/536 |

OTHER PUBLICATIONS

Vatti, Bala R., "A Generic Solution to Polygon Clipping," Communications of the ACM, Jul. 1992, Vol. 35, No. 7., pp. 56-63.
U.S. Appl. No. 11/586,041, filed Oct. 24, 2006.

* cited by examiner

*Primary Examiner* — Jacinta M Crawford
(74) *Attorney, Agent, or Firm* — Robert C. Kowert; Meyertons, Hood, Kivlin, Kowert & Goetzel, P.C.

(57) ABSTRACT

A method, system, and computer-readable storage medium are disclosed for rendering an artwork comprising a first plurality of objects. At least one common attribute shared by a second plurality of objects in the artwork may be automatically identified. The second plurality of objects may comprise a subset of the first plurality of objects. Each object of the second plurality of objects may be automatically assigned to a group. It may be determined whether the group is located within an area to be rendered. The group may be culled if the group is not located within the area to be rendered.

29 Claims, 7 Drawing Sheets

BATCH EARLY ENGAGEMENT RULES GRAPHICS PROCESSING

BACKGROUND

1. Field of the Invention

The present invention is directed to computer systems; and more particularly, it is directed to rendering two-dimensional artwork using computer systems.

2. Description of the Related Art

As the power and complexity of personal computer systems increase, graphics operations and graphical data are likewise increasing in complexity. Graphical data, particularly two-dimensional graphical data, may typically be expressed in a structured format that complies with a particular specification or model for representing such data. Instead of requiring application programs to describe every page as a full-resolution pixel array, a high-level imaging model may enable applications to describe the appearance of pages containing text, graphical shapes, and sampled images in terms of abstract graphical elements rather than directly in terms of device pixels. Such specifications and models may often be implemented across multiple computing platforms to facilitate the exchange of graphical data.

One such specification, the Adobe® Portable Document Format (PDF), is the native file format of the Adobe® Acrobat® family of products. By using products that implement the PDF format, users may exchange and view electronic documents in a manner that is substantially independent of the environment in which the documents were created. PDF includes an imaging model that describes text and graphics in a device-independent and resolution-independent manner. The PDF imaging model (i.e., the Adobe® Imaging Model) includes various structures to describe complex two-dimensional graphical data including geometric models and bit-mapped images.

In the PDF imaging model for two-dimensional graphics, "paint" is placed on a page in selected areas. Painted figures may be in the form of character shapes, geometric shapes, lines, or sampled images (e.g., digital representations of photographs). The content stream for a page may include operands and operators describing a sequence of objects. The types of objects may include path objects, text objects, and image objects. A path object comprises a sequence of connected and disconnected points, lines, and curves that together describe shapes and their positions. The path object may be constructed through the sequential application of path construction operators, each of which appends one or more new elements. A text object comprises one or more glyph shapes representing characters of text. The glyph shapes for the characters are described in a separate data structure called a font. An image object comprises a rectangular array of sample values, each representing a color at a particular position within the rectangle. Such objects are typically used to represent photographs.

The painting operators may use various explicit or implicit parameters. Implicit parameters may include the current color, current line width, current font, etc. Together, these implicit parameters make up the graphics state. Another implicit parameter in the graphics state may modify the results of painting graphics objects. The current clipping path outlines the area of the current page within which paint can be placed. Although painting operators may attempt to place marks anywhere on the current page, only those marks falling within the current clipping path affect the page; those falling outside it do not affect the page. Initially, the current clipping path encompasses the entire imagable area of the page. The current clipping path may temporarily be reduced to the shape defined by a path or text object, or to the intersection of multiple such shapes. Marks placed by subsequent painting operators are confined within that boundary. The optimization in which graphical data outside a clip path is discarded or modified to fit the clip path is referred to herein as "clipping."

The optimization in which graphical data outside the current field of view (e.g., offscreen) is not drawn is referred to herein as "culling." When the current view is scrolled, some displayed objects may be hidden while undisplayed objects may need to be drawn anew. Culling may be used in this scenario to minimize the number of redrawn objects. When scrolling, it is often possible to reuse some of the rasterization already inside the view (e.g., if the user scrolled the view by a small factor). Reusable regions may be referred to as "valid" regions, and regions that need to be re-painted (e.g., due to a scrolling operation) may be referred to as "invalid" or "dirty" regions. During a scrolling operation, the application may first move the valid pixels on screen. The application may then "invalidate" any dirty regions by deciding which part of the screen needs to be redrawn due to the scrolling.

In a prior approach, clipping is achieved by creating a stack of clipping operations that reflect nested contexts of validity of viewing. Independent "worlds" limited by a clip region may be incorporated into larger worlds, thereby creating recursive clipping regions. To render such regions, the clipping regions are walked like a tree, and every region is pushed into a clipping stack that represents the overall intersection of all the clipping regions up to this time. The clipping stack is popped when the viewer exits a clipping region, thereby restoring the previous clipping region. The current clipping region is represented typically as a set of scanlines representing the mask of the clip, and it is used to limit any marking operations to the clipping regions by making a bitwise operation with the mask. In a prior approach, the culling of objects is performed by maintaining an optimized culling table that represents the bounding boxes of the clip region.

Rendering a large and/or complex two-dimensional artwork (i.e., an artwork comprising many objects and/or especially complex objects) may require many culling and/or clipping operations. Using the prior approaches for clipping and culling, it may be necessary to perform a time-consuming set of atomic operations (e.g., culling, clipping, bitwise comparisons, marking, proceeding to the next object) for every object in the artwork, no matter how small the object.

SUMMARY

Various embodiments of systems, methods, and computer-readable storage media for rendering artwork are disclosed. An artwork may comprise a first plurality of objects. According to one embodiment, at least one common attribute shared by a second plurality of objects in the artwork may be automatically identified. The second plurality of objects may comprise a subset of the first plurality of objects. Each object of the second plurality of objects may be automatically assigned to a group. In identifying the objects and assigning them to the group, a set of batch early engagement rules may be applied. It may be determined whether the group is located within an area to be rendered. The area to be rendered may comprise a "dirty" region generated by a scroll operation. The group may be culled if the group is not located within the area to be rendered.

According to one embodiment, the common attribute may comprise a similarity in color or shape. A object sharing the common attribute may be added to the group if the object is adjacent in paint order to other objects in the group, if the object is spatially coherent with respect to other objects in the group, if the group does not exceed a threshold for size or complexity, and/or if the object does not violate a substantial homogeneity of the group.

According to a further embodiment, a clipping operation and/or an additional culling operation may be performed using a graphics processing unit (GPU). In the culling operation, a depth buffer of the GPU may be configured to reject pixels located outside a union of one or more dirty regions. In the clipping operation, a stencil buffer of the GPU may be configured to reject pixels located outside an intersection of one or more clip paths.

Figure 1:
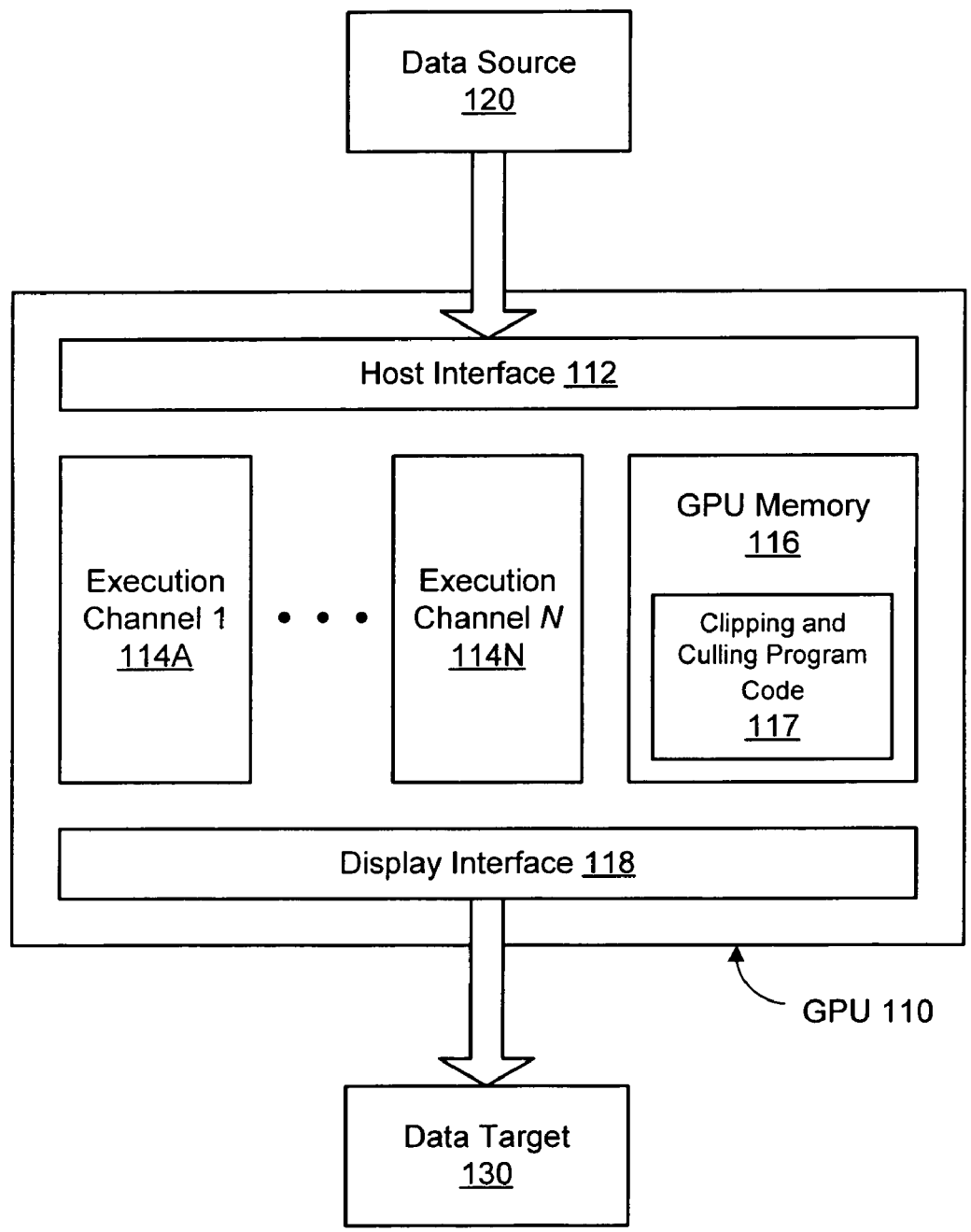
FIG. 1 is a block diagram illustrating one embodiment of a system configured for clipping and culling using a GPU.

While the invention is susceptible to various modifications and alternative forms, specific embodiments are shown by way of example in the drawings and are herein described in detail. It should be understood, however, that drawings and detailed description thereto are not intended to limit the invention to the particular form disclosed, but on the contrary, the invention is to cover all modifications, equivalents and alternatives falling within the spirit and scope of the present invention as defined by the appended claims.

DETAILED DESCRIPTION OF EMBODIMENTS

Figure 8:
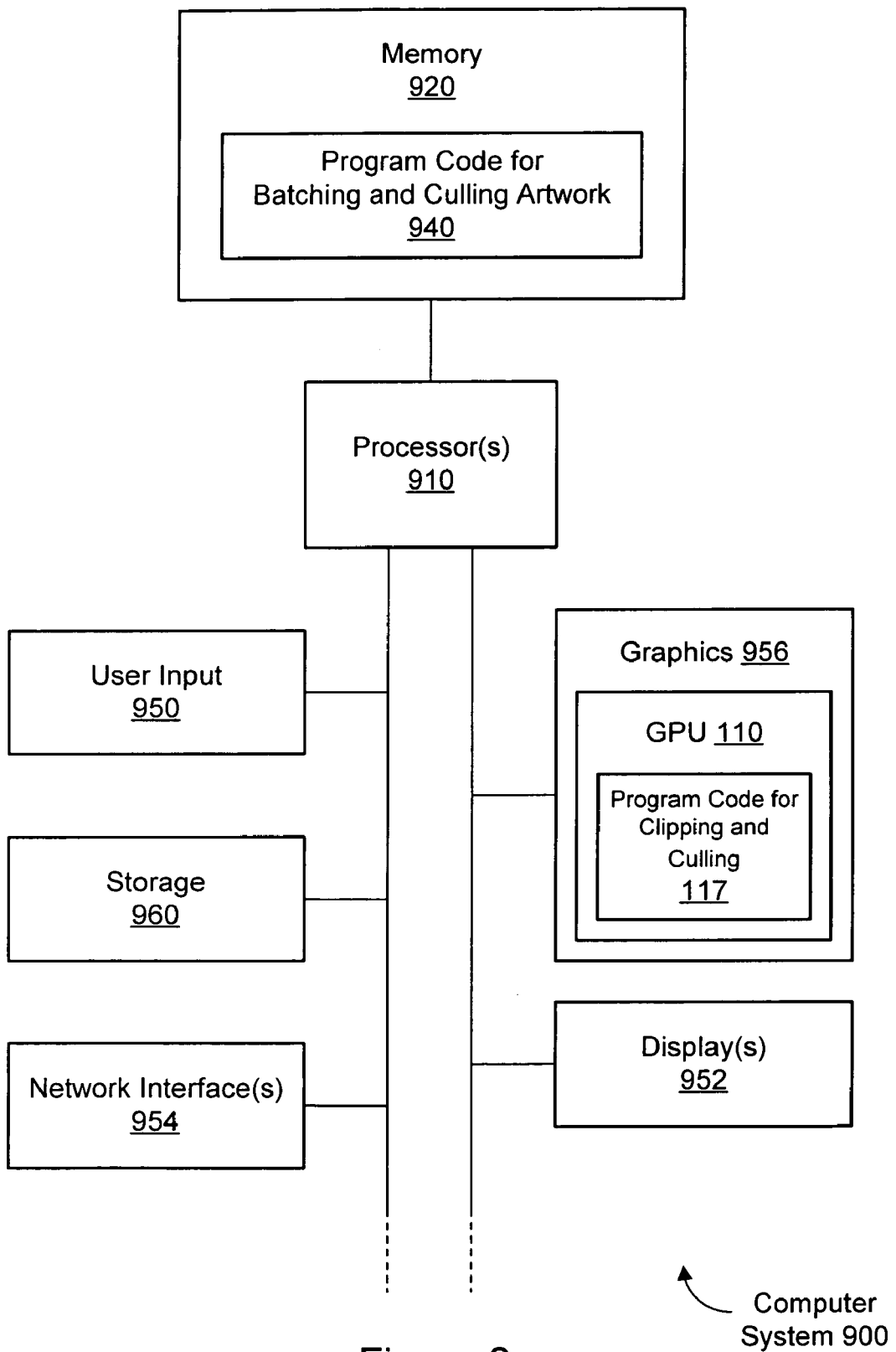
FIG. 8 is a block diagram illustrating constituent elements of a computer system that is configured to implement embodiments of the system and method for clipping and culling.

To reduce computational demands associated with rendering complex artwork on computer systems, the number of necessary clipping and/or culling operations may be reduced by automatically grouping artwork according to a set of rules. A graphics processing unit (GPU) may then be used to perform aspects of the clipping and/or culling operations. FIG. 1 is a block diagram illustrating one embodiment of a system configured for clipping and culling on a GPU according to the techniques described herein. A graphics processing unit (GPU) 110, also referred to herein as a graphics processor, may comprise a dedicated graphics rendering device associated with a computer system. An example of a suitable computer system 900 for use with a GPU 110 is illustrated in FIG. 8. Turning back to FIG. 1, a GPU 110 may include numerous specialized components configured to optimize the speed of rendering graphics output. For example, a GPU 110 may include specialized components for rendering three-dimensional structures, for applying textures to surfaces, etc. For the sake of illustration, however, only a limited selection of components is shown in the example GPU 110 of FIG. 1. It is contemplated that GPU architectures other than the example architecture of FIG. 1 may be suitable for implementing the techniques described herein. Suitable GPUs 110 may be commercially available from vendors such as NVIDIA Corporation, ATI Technologies, and others.

A GPU 110 may be used in a removable graphics card that is coupled to a motherboard via a standardized bus (e.g., AGP or PCI Express). A GPU 110 may also be used in an integrated graphics solution (e.g., for use in some portable computers and lower-cost desktop computers). The GPU 110 may include a host interface 112 configured to communicate with a data source 120 (e.g., a communications bus and/or processor(s) 910 of a host computer system 900, or the host system itself). For example, the data source 120 may provide input data and/or executable program code to the GPU 110. In some embodiments, the host interface 112 may permit the movement of data in both directions between the GPU 110 and the data source 120. The GPU 110 may also include a display interface 118 for providing output data to a data target 130. For example, the data target 130 may comprise a display device 952, and the GPU 110 (along with other graphics components and/or interfaces 956) may "drive" the display 952 by providing graphics data at a particular rate from a frame buffer. The GPU 110 may implement one or more application programmer interfaces (APIs) that permit programmers to invoke the functionality of the GPU.

In one embodiment, the GPU 110 may include internal memory 116. The GPU memory 116, also referred to herein as "video memory" or "VRAM," may comprise random-access memory (RAM) which is accessible to other GPU components. As will be described in greater detail below, the GPU memory 116 may be used in some embodiments to store various types of data and instructions such as input data, output data, intermediate data, program instructions for performing various tasks, etc. In one embodiment, the GPU 110 may also be configured to access memory 920 of a host computer system 900 via the host interface 112 as shown in FIG. 8.

In one embodiment, the GPU 110 may include a plurality of execution channels 114A-114N as illustrated in FIG. 1. Using the plurality of execution channels 114A-114N, the GPU 110 may process a plurality of tasks in a substantially parallel manner, such that a plurality of the execution channels 114A-114N are simultaneously in use. Each of the execution channels 114A-114N may perform tasks independent of the other execution channels 114A-114N. The GPU 110 may be configured to process multi-channel input and produce multi-channel output. Multi-channel input may comprise vectorized input, and multi-channel output may comprise vectorized output. In one embodiment, the data in one channel of the multi-channel input may be processed by the GPU 110 in a manner that is substantially independent of the processing of data in the other channels. In one embodiment, the multi-channel input and multi-channel output may comprise graphical data having a plurality of channels. For example, the plurality of channels may represent RGBA data (data comprising separate channels for red, green, blue, and alpha data), vertices, textures, etc. The plurality of channels may comprise overlapping channels in a rectangular area of graphical data. In one embodiment, the number of the channels in the multi-channel input and multi-channel output may be equal to the number of execution channels in the GPU 110 for optimal parallel processing. In one embodiment, the GPU 110 may include additional components configured to control the plurality of execution channels 114A-114N, such as by distributing portions of the multi-channel input to individual execution channels. In this manner, the GPU 110 may perform operations on multi-channel input data.

The GPU 110 may also be configured to perform single-channel operations on single-channel data using only one of the plurality of execution channels 114A-114N. A single-channel operation may comprise an operation on non-vectorized input or input having only one channel (e.g., graphical data having only one channel). When the GPU 110 is used in this manner, however, the remaining execution channels may be idle.

By performing aspects of clipping and/or culling operations on the GPU, the computational load on the host CPU may be reduced. Program code 117 comprising instructions for clipping and/or culling portions of artwork may be provided to the GPU 110. The program code may be stored in the GPU memory 116 and executed by one or more of the execution channels 114A-114D. The program code 117 may be configured to fetch and process a plurality of channels of input data in a parallel manner. In one embodiment, the program code 117 may be provided to the GPU 110 by the CPU 910 or other components of the computer system shown in FIG. 8. In one embodiment, aspects of the program code 117 may be native to the GPU 110.

The program code 117 may comprise a vertex shader and/or a pixel shader. A vertex shader comprises program instructions that are executable by the GPU to determine properties (e.g., position) of a particular vertex. A vertex shader may expect input such as uniform variables (e.g., constant values for each invocation of the vertex shader) and vertex attributes (e.g., per-vertex data). A pixel shader comprises program instructions that are executable by the GPU to determine properties (e.g., color) of a particular pixel. A pixel shader may expect input such as uniform variables (e.g., constant values for each invocation of the pixel shader) and pixel attributes (e.g., per-pixel data).

Figure 2:
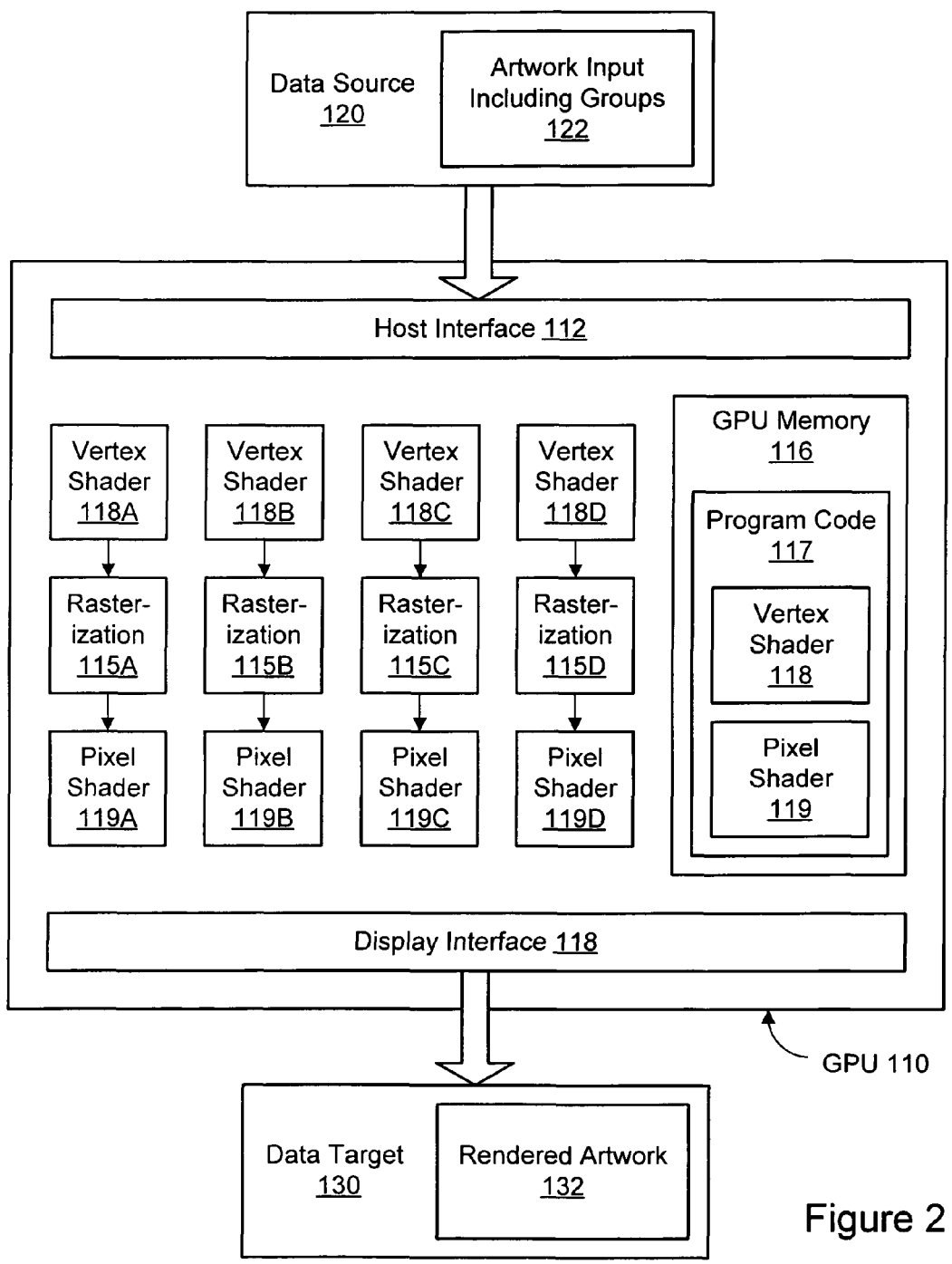
FIG. 2 is a block diagram illustrating one embodiment of a system configured for clipping and culling using multiple execution channels of a GPU.

FIG. 2 is a block diagram illustrating one embodiment of a system configured for clipping and culling using multiple (e.g., four) execution channels 114A-114D of a GPU. Artwork input 122 comprising a plurality of objects may be provided to the GPU 110 by a data source 120 such as a host CPU. In one embodiment, the artwork 122 is organized as a tree. The tree may comprise groups (logical or drawing entities) and atomic drawing operations. The artwork may be drawn by traversing the tree in the paint order. In one embodiment, the objects may be tessellated on the CPU prior to being sent to the GPU. In one embodiment, the input 122 may be subdivided for distribution to different ones of the execution channels 114A-114D for efficient parallel processing. In each of the execution channels, a vertex shader 118A-118D may be executed to determine vertex values for each input vertex. Next, in a rasterization step 115A-115D, the vertex values may be converted to pixel values. In each of the execution channels, a pixel shader 119A-119D may then be executed on the pixel values to determine a final color of each pixel for the display output. As will be discussed in greater detail below, clipping and/or culling operations may be performed on the GPU at various points in the rendering pipeline. The rendered artwork may be provided as output 132, e.g., for display on a display device coupled to the host computer system. In another embodiment, a different number of execution channels (i.e., as few as one) may be used to perform the operations.

In various embodiments, one or more techniques may be used optimize the rendering of the artwork by the GPU. In one embodiment, objects in the artwork may be grouped early (i.e., as the artwork is created) on the CPU. The grouping may enable early and efficient culling by the CPU. In one embodiment, clipping and culling may be implemented in the GPU. In one embodiment, features of the GPU pipeline may be leveraged to take advantage of the parallelism of the GPU for clipping and culling.

Often, users may not assign objects in their artwork to specific groups. Therefore, many pieces of artwork may comprise only a single root group including all the objects in the artwork. The automatic creation of additional, artificial groups at an early stage may permit rendering optimizations later in the pipeline. In one embodiment, objects in the artwork may be assigned to artificial groups early in the process of creating or defining the artwork. The objects may be placed in one or more groups automatically (i.e., without user intervention) and programmatically (i.e., by execution of a computer program on a computer) according to a set of rules. The rules may comprise heuristics for determining similarities in spatial relationship, paint order, and/or other suitable properties among objects. The rules may be referred to herein as Batch Early Engagement Rules (BEER). The rules may be used to batch objects together while maintaining the paint order of the objects. The rules may seek to preserve the locality of the objects grouped (i.e., their spatial relationship) so that the created groups may be culled more efficiently. The application of the rules may vary according to factors that are specific to a particular two-dimensional graphics application.

Figure 3:
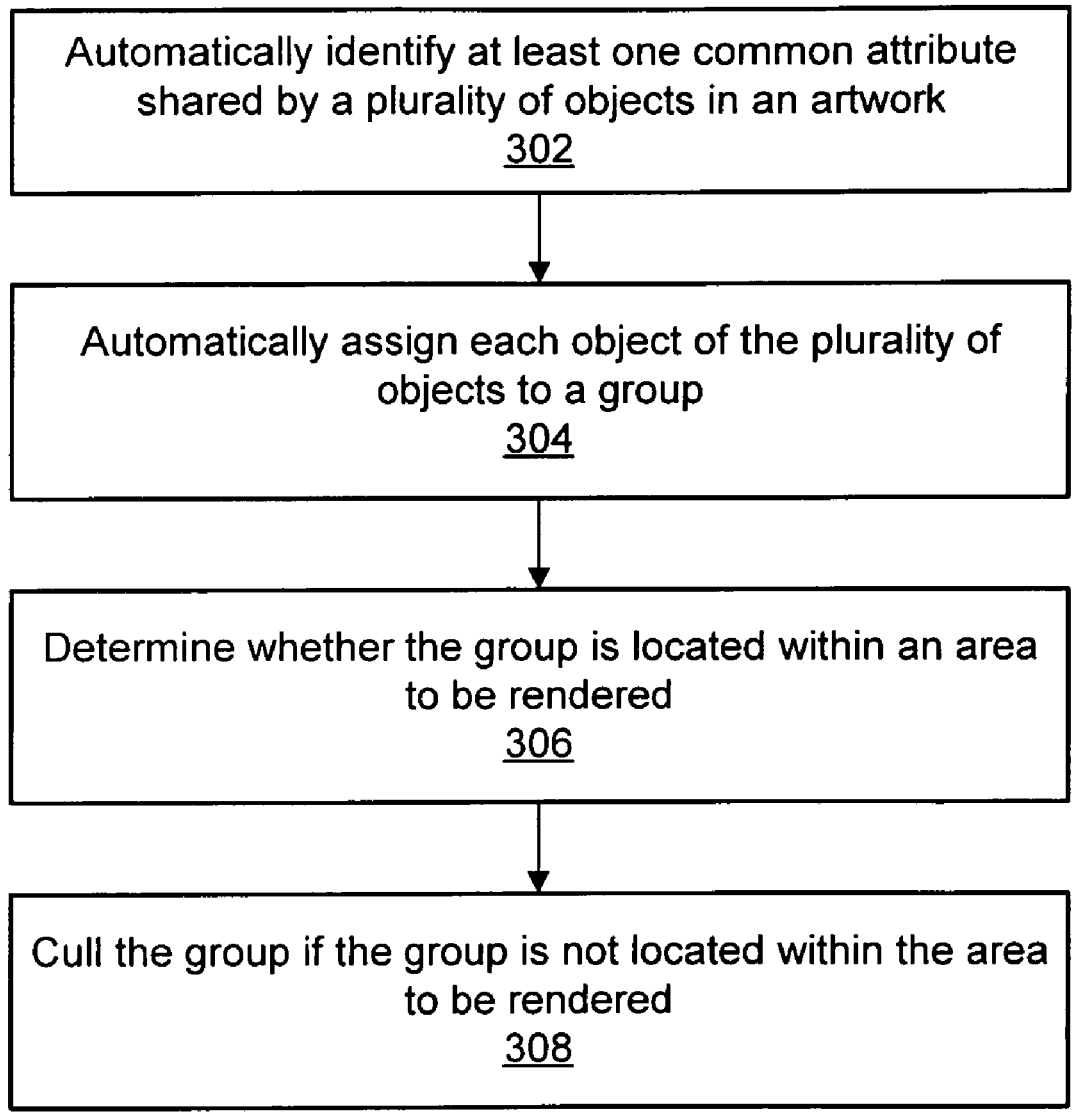
FIG. 3 is a flow diagram illustrating a method for automatically batching objects into artificial groups according to one embodiment.

FIG. 3 is a flow diagram illustrating a method for grouping objects in an artwork according to one embodiment. An artwork may comprise a first plurality of objects. As shown in block 302, at least one common attribute shared by a second plurality of objects in the artwork may be automatically identified. The second plurality of objects may comprise a subset of the first plurality of objects. As shown in block 304, each object of the second plurality of objects may be automatically assigned to a group. In identifying the objects and assigning them to the group, the batch early engagement rules may be applied. As shown in block 306, it may be determined whether the group is located within an area to be rendered. For example, the area to be rendered may comprise a "dirty" region generated by a scroll operation. As shown in block 308, the group may be culled if the group is not located within the area to be rendered.

In one embodiment, the rules may be applied once for each artwork (i.e., an artwork tree comprising a collection of objects) and not for every drawing operation in a two-dimensional graphics application. In one embodiment, the rules may be applied to create one or more groups periodically, as objects are added to the artwork. In one embodiment, the rules may be applied to create one or more groups at some other point in the creation of the artwork (e.g., when the artwork is saved).

Figure 4:
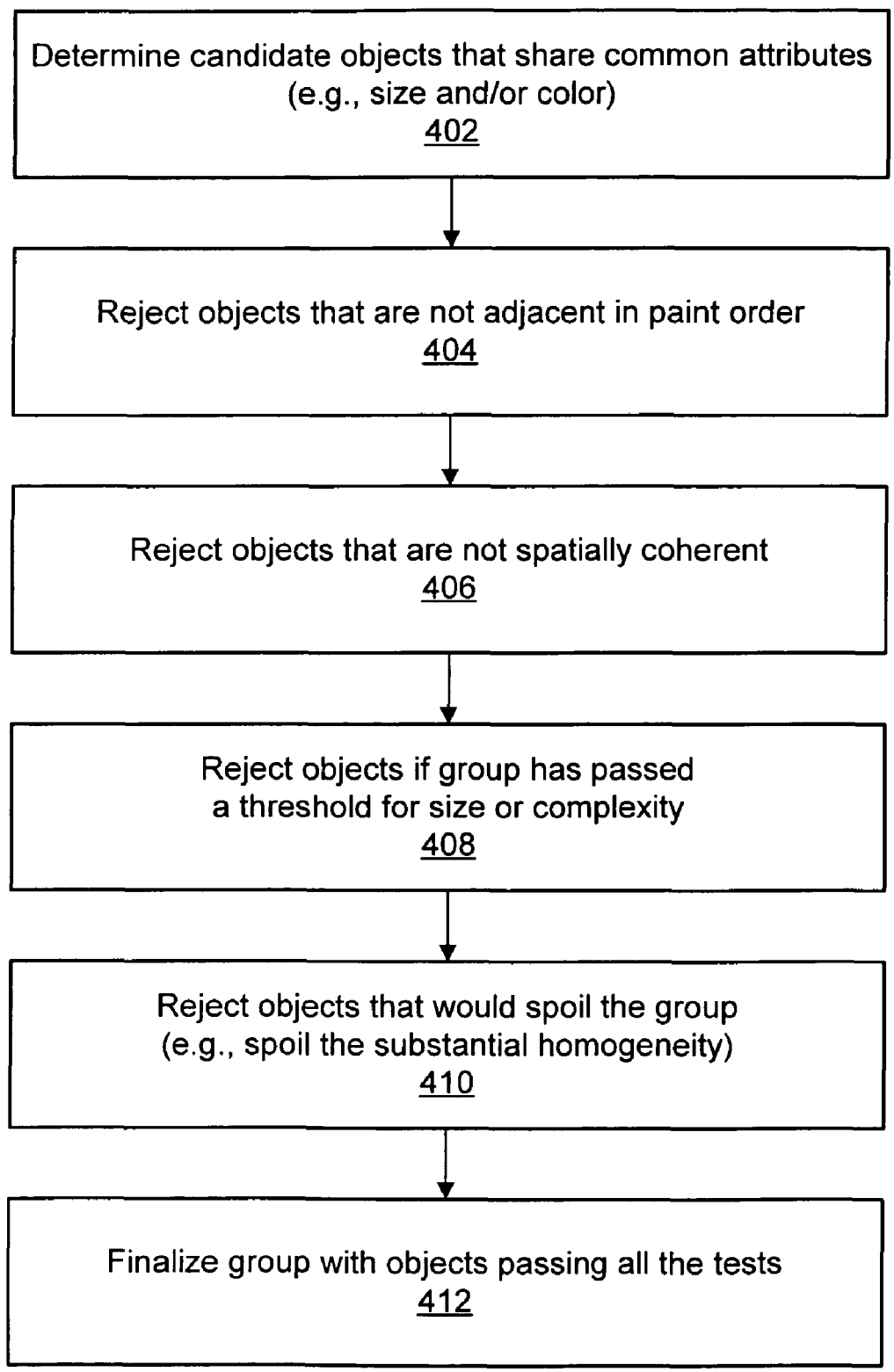
FIG. 4 is a flow diagram illustrating further aspects of a method for automatically batching objects into artificial groups according to one embodiment.

In various embodiments, the rules for generating batches may be based on one or more factors such as the commonality of attributes among objects, the proximity of objects in the paint order, the spatial coherence of the objects, the size of the batch, and other suitable factors. FIG. 4 is a flow diagram illustrating further aspects of a method for batching objects into groups according to one embodiment. In various embodiments, some of the blocks shown in FIG. 4 may be performed in a different order or not at all. In one embodiment, the blocks shown in FIG. 4 may be performed by executing program instructions on a CPU. In one embodiment, one or more of the blocks shown in FIG. 4 may involve storing graphical data and/or metadata in the main memory of a computer system. In various embodiments, elements shown in FIG. 4 may be used to create a group or to add an object to an existing group.

As shown in block 402, objects considered for batching may share common attributes such as similarities in color or shape (e.g., text, contour, stroke, etc.). By grouping objects that share such attributes, the common attributes may be associated with the group instead of with the individual objects to save memory resources. In one embodiment, objects that are too dissimilar in terms of these attributes may not be grouped.

In one embodiment, only objects that are adjacent to each other in paint order may be considered for assignment to the same batch. Therefore, as shown in block 404, objects not adjacent in paint order may be rejected from group membership.

After candidate objects have been identified, the bounds of the objects may be considered. The batch may be limited to a set of objects having spatial coherence. In one embodiment, as shown in block 406, an object may not be added to an existing group if the object is located at a distance which exceeds the current boundary size of the group by a pre-defined factor (e.g., twenty times larger). In this manner, the spatial locality of objects in the group may be preserved.

The size of the batch may be limited. In one embodiment, the size of the batch may be limited to a pre-defined maximum number of objects (e.g., 100 objects). In one embodiment, the size of the batch may be limited to a pre-defined threshold of object complexity (e.g., 500 Bezier points per path). In one embodiment, the size of the batch may be limited by any other suitable threshold for size or complexity, such as a maximum number of points per batch, a total area for the batch, an estimated number of tessellated triangles for the batch, etc. As shown in block 408, candidate objects may be rejected from group membership once a size and/or complexity threshold has been reached. In one embodiment, an object may be rejected if any one of a plurality of size and/or complexity thresholds has been reached.

In one embodiment, as shown in block 410, additional factors may be applied to limit "spoiling" a batch. For example, an object may be rejected if it is dissimilar from a group that is substantially homogeneous in some aspect of its composition. Therefore, block 410 may result in the rejection of a white stroke that was a candidate for inclusion in a group consisting of fifty black strokes.

As shown in block 412, any candidate object that has passed all the tests may have its membership in the group finalized. In one embodiment, a candidate object may be added to the group if the object is adjacent in paint order to other objects in the group, if the object is spatially coherent with respect to other objects in the group, if the group does not exceed a threshold for size or complexity, and/or if the object does not violate a substantial homogeneity of the group.

Each graphic object lies within defined bounds. The bounds may comprise, for example, a circle, a square, or a region defined by a mathematical formula (e.g., a Bezier region). By adding a plurality of objects to a group, an association of objects may be created whose bounds are the union of those objects. The bounds of the group may be determined to be the union of the bounds of its member objects. In one embodiment, the method shown in FIG. 4 may be applied again for additional objects and/or additional groups. In one embodiment, some of the objects in the artwork may not qualify for one of the artificially created groups and may remain in the root group. In preparation for culling and rendering, each group may be tessellated (i.e., reduced to polygons such as triangles) as a single mesh.

In one embodiment, the created group(s) may be stored with the artwork as part of the artwork tree or in another suitable form of metadata. The artificially created group(s) may comprise an optional layer of metadata on top of the original artwork. An application that is not configured to read the group metadata may read the original artwork as if the artificial group(s) had never been created.

The creation of one or more groups as shown in FIGS. 3 and 4 may provide for more efficient culling by permitting all of the objects in a group to be discarded as a result of culling the group itself. Culling may be performed by intersecting the bounding box of a graphic object with one or more dirty regions. If the bounds of the group are entirely outside the dirty region(s), then the contents of the group may be ignored for the current paint operation. The culling of groups at an early stage may prevent the need to inspect and cull many individual objects. The culling of groups may be optimized by creating groups that are spatially coherent as shown in FIG. 4.

In one embodiment, an initial group culling operation may be performed on the groups using the CPU and main memory of the computer system. Because the GPU is typically faster than the CPU for graphics operations, excessive culling on the CPU may pose a bottleneck for the final rendering of the artwork on the GPU. By minimizing the time required for culling on the CPU and thereby minimizing a potential CPU bottleneck, utilization of the GPU may be improved.

After the initial culling of the artwork 122 on the CPU, the remaining artwork 122 may be sent to the GPU for rendering. The artwork 122 may be sent to the GPU as a polygonal mesh of vertices with various uniform variables and per-vertex attributes. The artwork 122 may be sent to the GPU in one or more batches with a suitable API call or calls.

Figure 5:
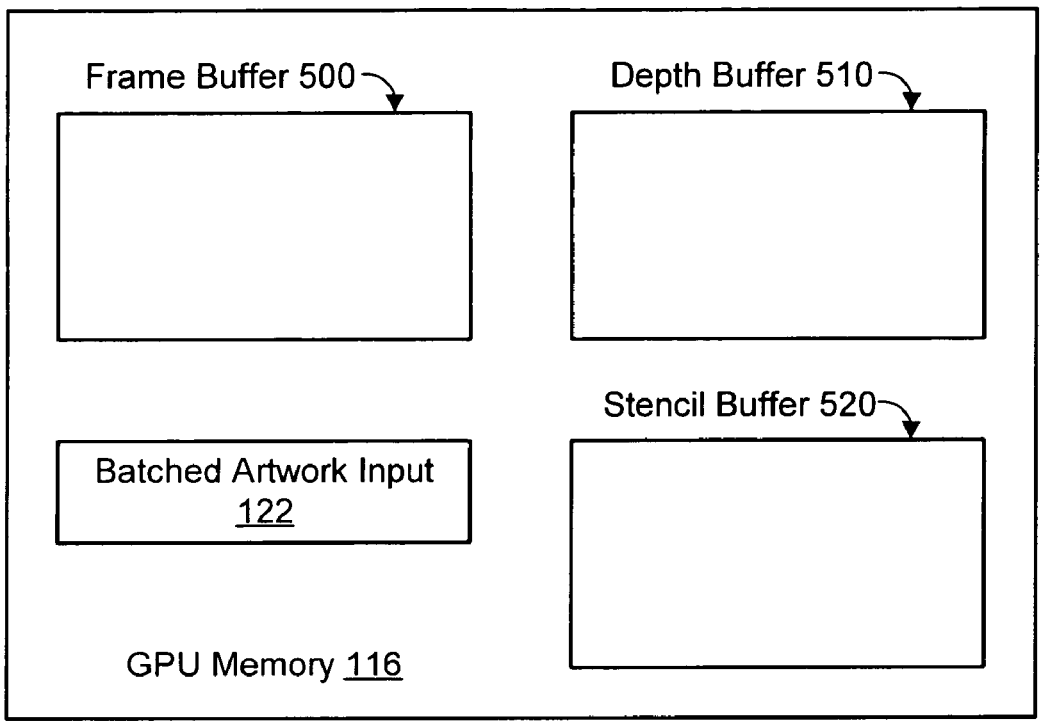
FIG. 5 is a block diagram illustrating a GPU memory comprising a frame buffer, a depth buffer, and a stencil buffer configured for clipping and culling artwork on the GPU according to one embodiment.

As shown in FIG. 5, the GPU memory 116 may comprise a frame buffer 500, a depth buffer 510, and a stencil buffer 520 which are configured to implement aspects of the clipping and culling operations on the GPU as described below. The frame buffer 500 may comprise a two-dimensional array of pixels. Typically, the dimensions of the frame buffer are the same as those of the target display. The depth buffer 510 (also referred to herein as the z buffer) may comprise a two-dimensional array of depth (z) values. In one embodiment, the depth buffer may have the same dimensions as the frame buffer such that there is a one-to-one correspondence between a pixel in the frame buffer and a pixel in the depth buffer. The GPU memory 116 may also comprise a stencil buffer 520 comprising a two-dimensional array of values (e.g., 8-bit values). In one embodiment, the stencil buffer may have the same dimensions as the frame buffer such that there is a one-to-one correspondence between a pixel in the frame buffer and a value in the stencil buffer.

Figure 6:
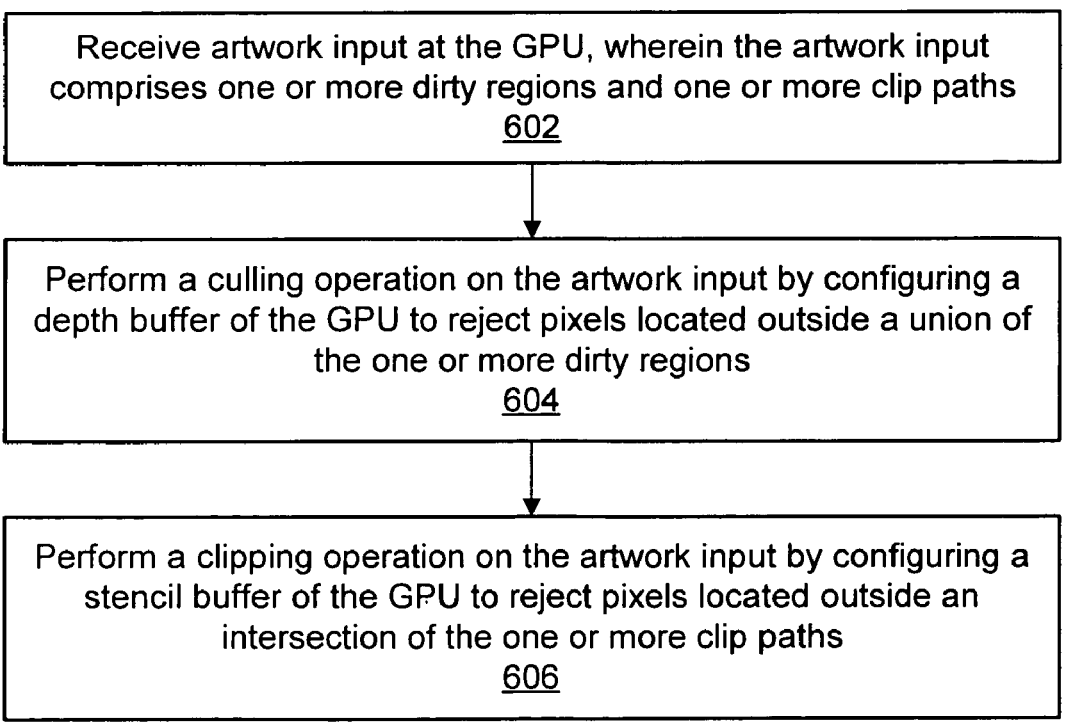
FIG. 6 is a flow diagram illustrating a method for clipping and culling artwork using a GPU according to one embodiment.

FIG. 6 is a flow diagram illustrating a method for clipping and culling artwork using a GPU according to one embodiment. As shown in block 602, artwork input may be received at the GPU. The artwork input may comprise one or more dirty regions and one or more clip paths. As shown in block 604, a culling operation may be performed on the artwork input. In performing the culling operation, a depth buffer of the GPU may be configured to reject pixels located outside a union of the one or more dirty regions. If there is only one dirty region, then the union is identical to the single dirty region. As shown in block 606, a clipping operation may be performed on the artwork input. In performing the clipping operation, a stencil buffer of the GPU may be configured to reject pixels located outside an intersection of the one or more clip paths. If there is only one clip path, then the intersection is identical to the single clip path. The culling and clipping operations are discussed in greater detail below.

Using the GPU 110, the artwork may be clipped appropriately and painted to the frame buffer as pixels. The portion to be painted may comprise the intersection of the dirty regions (i.e., as related to the culling operation) and by the current clip of the artwork. Because the GPU may be organized as a pipeline (or set of pipelines operating in parallel), different components in the GPU pipeline may be used for culling and clipping.

The GPU 110 may comprise an EarlyZ feature that can be configured to eliminate data early in the GPU pipeline (e.g., before the pixel shader 119 is executed). To take advantage of the EarlyZ feature for culling additional artwork, the viewport bounds in the GPU may be set to the smallest rectangle that encompasses the union of the dirty regions (i.e., the region(s) to be redrawn). In one embodiment, every pixel in the depth buffer 510 corresponding to a pixel in the viewport may be assigned a first depth value (e.g., 1). The dirty region (s) may then be painted such that the depth buffer is set to a second depth value (e.g., 0) for each pixel inside the dirty region(s). The union of the dirty regions may comprise an L-shaped area such that a rectangular portion of the viewport may not reside within the dirty regions. In one embodiment, a z-test feature associated with the depth buffer may be configured to cull any pixel with the first depth value (i.e., any pixel in the viewport but not in the dirty region(s)). In this manner, the EarlyZ feature and the depth buffer 510 may be configured to reject anything outside of the dirty region(s). In one embodiment, the depth buffer 510, z-test feature, and/or EarlyZ feature may be appropriately configured through one or more API calls.

In one embodiment, the stencil buffer 520 may be used to implement clipping in the GPU. A clip path specified in the artwork may not be rectangular, and an intersection of multiple overlapping clip paths may need to be determined. The pixels to be drawn are the pixels inside the intersection of the one or more clip paths. Prior to using the stencil buffer for clipping, each pixel in the stencil buffer may be initialized with a uniform initial value (e.g., 0). Then, for each clip path (i.e., a polygonal boundary), the value of each point in the stencil buffer corresponding to a pixel inside the clip path may be incremented. After all the clip paths have been processed in this manner, the resulting intersection of the clip paths may be represented in the stencil buffer by the pixels having the highest value. In one embodiment, the pixels to be drawn are represented in the stencil buffer by the sum of the number of clip paths plus the uniform initial value (e.g., 0). By configuring a stencil test associated with the stencil buffer to match the number of clip paths, the pixels outside the intersection of the clip paths may be clipped away, and only the pixels inside the intersection of the clip paths may be painted.

In one embodiment, the stencil buffer may be managed by using a stack for the clip paths. When a clip path is popped out of the drawing stack, it may be drawn in the stencil buffer with the value of the affected pixels decremented. The stencil test may be modified accordingly so that the correct pixels are painted. In this manner, the proper intersection of the clip paths may be restored after the interior of a clip path is rendered.

Figure 7:
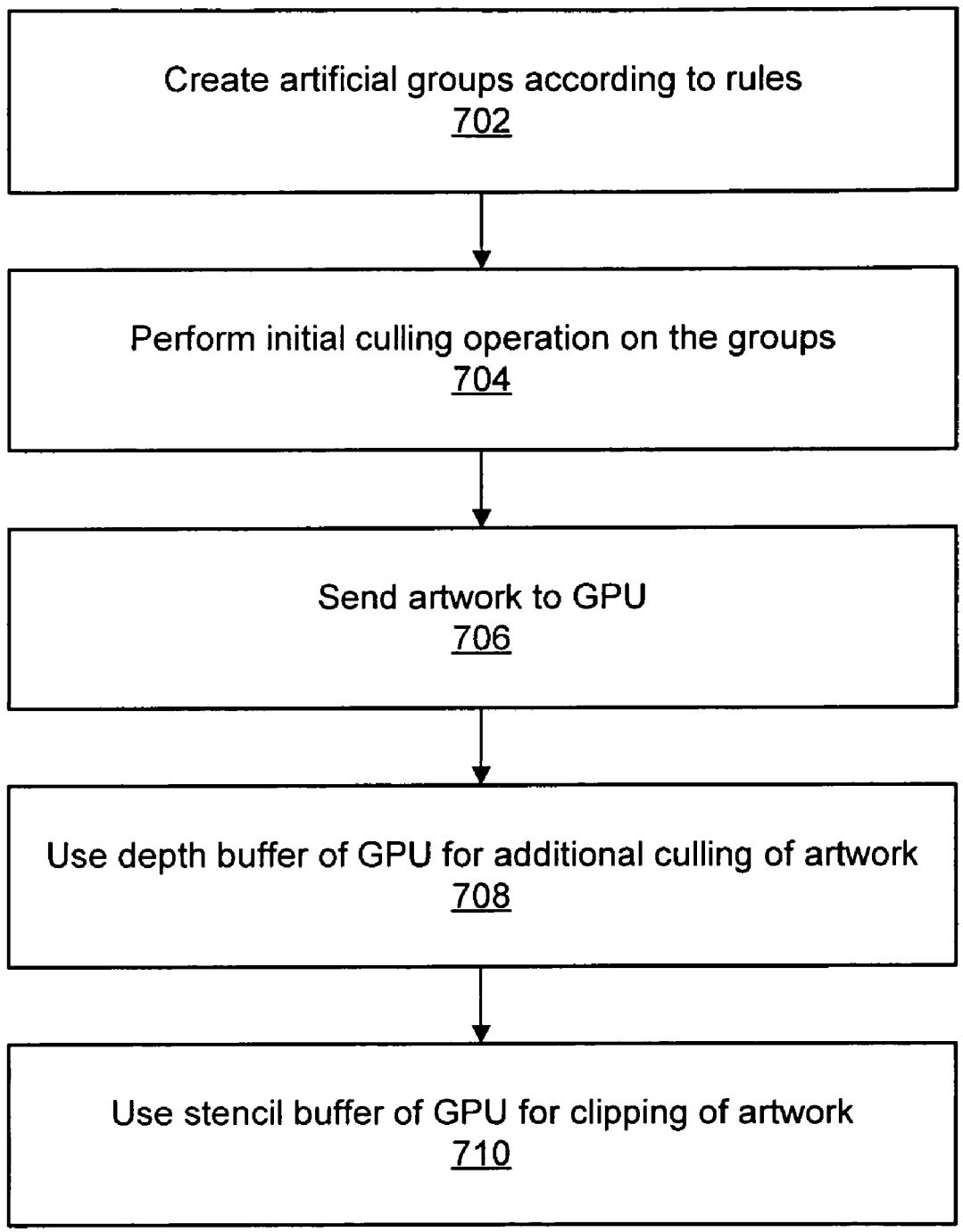
FIG. 7 is a flow diagram illustrating a method for batching, clipping, and culling artwork for rendering with a GPU according to one embodiment.

In one embodiment, various ones of the techniques described herein may be combined for efficient rendering of artwork. FIG. 7 is a flow diagram illustrating a method for batching, clipping, and culling artwork for efficiently rendering the artwork with a GPU according to one embodiment. As shown in block 702, one or more artificial groups may be automatically created as discussed with reference to FIGS. 3 and 4. As shown in block 704, an initial culling operation may be performed on the CPU by examining the one or more artificial groups rather than the individual objects in the groups. As shown in block 706, the resulting culled artwork may be sent to the GPU for rendering. As shown in block 708, the depth buffer of the GPU may be used for additional culling as discussed with reference to FIG. 6. As shown in block 710, the stencil buffer of the GPU may be used for clipping the artwork to one or more clip paths as discussed with reference to FIG. 6.

In various embodiments, the blocks shown in FIGS. 3, 4, 6, and 7 may be performed in a different order than the illustrated order. In FIGS. 3, 4, 6, and 7, any of the operations described in the blocks may be performed programmatically (i.e., by a computer according to a computer program). In FIGS. 3, 4, 6, and 7, any of the operations described in the blocks may be performed automatically (i.e., without user intervention).

FIG. 8 is a block diagram illustrating constituent elements of a computer system 900 that is configured to implement embodiments of the system and method disclosed herein for batching, clipping, and/or culling artwork. The computer system 900 may include one or more processors 910 implemented using any desired architecture or chip set, such as the SPARC™ architecture, an x86-compatible architecture from Intel Corporation or Advanced Micro Devices, or an other architecture or chipset capable of processing data. Any desired operating system(s) may be run on the computer system 900, such as various versions of Unix, Linux, Windows™ from Microsoft Corporation, MacOS™ from Apple Corporation, or any other operating system that enables the operation of software on a hardware platform. The processor (s) 910 may be coupled to one or more of the other illustrated components, such as a memory 920, by at least one communications bus.

In one embodiment, the GPU 110 may be included in a specialized graphics card or other graphics component 956 that is coupled to the processor(s) 910.

Additionally, the computer system 900 may include one or more displays 952. In one embodiment, the display(s) 952 may be coupled to the graphics card 956 for display of data provided by the graphics card 956.

Program instructions 940 that may be executable by the processor(s) 910 to implement aspects of the techniques described herein (e.g., for batching artwork) may be partly or fully resident within the memory 920 at the computer system 900 at any point in time. As is described with reference to FIGS. 1 and 2, another set of program instructions 117 may be provided to the GPU 110 for clipping and/or culling artwork on the GPU 110. The memory 920 may be implemented using any appropriate medium such as any of various types of ROM or RAM (e.g., DRAM, SDRAM, RDRAM, SRAM, etc.), or combinations thereof. The program instructions 940 may also be stored on a storage device 960 accessible from the processor(s) 910. Any of a variety of storage devices 960 may be used to store the program instructions 940 in different embodiments, including any desired type of persistent and/or volatile storage devices, such as individual disks, disk arrays, optical devices (e.g., CD-ROMs, CD-RW drives, DVD-ROMs, DVD-RW drives), flash memory devices, various types of RAM, holographic storage, etc. The storage 960 may be coupled to the processor(s) 910 through one or more storage or I/O interfaces. In some embodiments, the program instructions 940 may be provided to the computer system 900 via any suitable computer-readable storage medium including the memory 920 and storage devices 960 described above.

The computer system 900 may also include one or more additional I/O interfaces, such as interfaces for one or more user input devices 950. In addition, the computer system 900 may include one or more network interfaces 954 providing access to a network. It should be noted that one or more components of the computer system 900 may be located remotely and accessed via the network. The program instructions 940 may be implemented in various embodiments using any desired programming language, scripting language, or combination of programming languages and/or scripting languages, e.g., C, C++, C#, Java™, Perl, etc. It will be apparent to those having ordinary skill in the art that computer system 900 can also include numerous elements not shown in FIG. 8, as illustrated by the ellipsis shown.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A computer-implemented method for rendering an artwork comprising a first plurality of objects, comprising:
    automatically identifying at least one common attribute shared by a second plurality of objects in the artwork, wherein the second plurality of objects comprises a subset of the first plurality of objects;
    automatically assigning each object of the second plurality of objects to a group based on the identification of the at least one common attribute;
    determining bounds of the group based on bounds of each object in the group;
    determining whether the group is located either within an area to be rendered or entirely within an area not to be rendered by comparing the bounds of the group to the area to be rendered; and
    culling the group if the group is located entirely within the area not to be rendered and not located within the area to be rendered.

2. The method as recited in claim 1, wherein the at least one common attribute comprises a similarity in shape.

3. The method as recited in claim 1, wherein the at least one common attribute comprises a similarity in color.

4. The method as recited in claim 1, wherein each object of the second plurality of objects is automatically assigned to the group if the object is adjacent in paint order to other objects in the group.

5. The method as recited in claim 1, wherein each object of the second plurality of objects is automatically assigned to the group if the object is spatially coherent with respect to other objects in the group.

6. The method as recited in claim 1, wherein each object of the second plurality of objects is automatically assigned to the group if the group does not exceed a threshold for size or complexity.

7. The method as recited in claim 1, wherein each object of the second plurality of objects is automatically assigned to the group if the object does not violate a substantial homogeneity of the group.

8. The method as recited in claim 1, further comprising:
    storing a group membership for each object in the group as metadata for the artwork.

9. The method as recited in claim 1, further comprising:
    rendering the area to be rendered with a graphics processing unit (GPU).

10. The method as recited in claim 9, wherein rendering the area to be rendered with the GPU comprises:
    performing a culling operation using a depth buffer of the GPU.

11. The method as recited in claim 9, wherein rendering the area to be rendered with the GPU comprises:
    performing a clipping operation using a stencil buffer of the GPU.

12. A system, comprising:
    at least one central processing unit (CPU); and
    a memory coupled to the at least one CPU, wherein the memory is configured to store an artwork comprising a first plurality of objects, and wherein the memory is configured to store program instructions executable by the at least one CPU to:
        automatically identify at least one common attribute shared by a second plurality of objects in the artwork, wherein the second plurality of objects comprises a subset of the first plurality of objects;
        automatically assign each object of the second plurality of objects to a group based on the identification of the at least one common attribute;
        determine bounds of the group based on bounds of each object in the group;
        determine whether the group is located either within an area to be rendered or entirely within an area not to be rendered by comparing the bounds of the group to the area to be rendered; and
        cull the group if the group is located entirely within the area not to be rendered and not located within the area to be rendered.

13. The system as recited in claim 12, wherein the at least one common attribute comprises a similarity in shape.

14. The system as recited in claim 12, wherein the at least one common attribute comprises a similarity in color.

15. The system as recited in claim 12, wherein each object of the second plurality of objects is automatically assigned to the group if the object is adjacent in paint order to other objects in the group.

16. The system as recited in claim 12, wherein each object of the second plurality of objects is automatically assigned to the group if the object is spatially coherent with respect to other objects in the group.

17. The system as recited in claim 12, wherein each object of the second plurality of objects is automatically assigned to the group if the group does not exceed a threshold for size or complexity.

18. The system as recited in claim 12, wherein each object of the second plurality of objects is automatically assigned to the group if the object does not violate a substantial homogeneity of the group.

19. The system as recited in claim 12, further comprising:
    a graphics processing unit (GPU); and
    a video memory coupled to the GPU, wherein the video memory comprises a depth buffer and a stencil buffer;
    wherein the GPU is configured to perform a culling operation on the artwork using the depth buffer and perform a clipping operation on the artwork using the stencil buffer.

20. A non-transitory, computer-readable storage medium, comprising program instructions, wherein the program instructions are computer-executable to implement:
    automatically identifying at least one common attribute shared by a second plurality of objects in the artwork, wherein the second plurality of objects comprises a subset of the first plurality of objects;
    automatically assigning each object of the second plurality of objects to a group based on the identification of the at least one common attribute;
    determining bounds of the group based on bounds of each object in the group;

determining whether the group is located either within an area to be rendered or entirely within an area not to be rendered by comparing the bounds of the group to the area to be rendered; and culling the group if the group is located entirely within the area not to be rendered and not located within the area to be rendered.

21. The non-transitory, computer-readable storage medium as recited in claim 20, wherein the at least one common attribute comprises a similarity in shape.

22. The non-transitory, computer-readable storage medium as recited in claim 20, wherein the at least one common attribute comprises a similarity in color.

23. The non-transitory, computer-readable storage medium as recited in claim 20, wherein each object of the second plurality of objects is automatically assigned to the group if the object is adjacent in paint order to other objects in the group.

24. The non-transitory, computer-readable storage medium as recited in claim 20, wherein each object of the second plurality of objects is automatically assigned to the group if the object is spatially coherent with respect to other objects in the group.

25. The non-transitory, computer-readable storage medium as recited in claim 20, wherein each object of the second plurality of objects is automatically assigned to the group if the group does not exceed a threshold for size or complexity.

26. The non-transitory, computer-readable storage medium as recited in claim 20, wherein each object of the second plurality of objects is automatically assigned to the group if the object does not violate a substantial homogeneity of the group.

27. The non-transitory, computer-readable storage medium as recited in claim 20, wherein the program instructions are further computer-executable to implement:

storing a group membership for each object in the group as metadata for the artwork.

28. The non-transitory, computer-readable storage medium as recited in claim 20, wherein the program instructions are further computer-executable to implement:

sending the artwork to a graphics processing unit (GPU) to render the area to be rendered.

29. A computer-implemented method for processing an artwork comprising a first plurality of objects, comprising:

automatically identifying at least one common attribute shared by a second plurality of objects in the artwork, wherein the second plurality of objects comprises a subset of the first plurality of objects;

automatically assigning each object of the second plurality of objects to a group if the object is spatially coherent with respect to the group; and determining bounds of the group based on bounds of each object in the group;

determining whether the group is located either within an area to be rendered or entirely within an area not to be rendered by comparing the bounds of the group to the area to be rendered; and culling the group if the bounds of the group are located entirely within the area not to be rendered.

* * * * *